US010815440B2

(12) United States Patent
Chandran et al.

(10) Patent No.: US 10,815,440 B2
(45) Date of Patent: Oct. 27, 2020

(54) SYSTEMS AND METHODS FOR PRODUCING SYNGAS FROM A SOLID CARBON-CONTAINING SUBSTANCE USING A REACTOR HAVING HOLLOW ENGINEERED PARTICLES

(71) Applicant: Thermochem Recovery International, Inc., Baltimore, MD (US)

(72) Inventors: Ravi Chandran, Ellicott City, MD (US); Jonathan A. Zenz, Poughkeepsie, NY (US); Dave G. Newport, Cumberland, ME (US); Hamilton Sean Michael Whitney, Baltimore, MD (US)

(73) Assignee: ThermoChem Recovery International, Inc., Baltimore, MD (US)

( * ) Notice: Subject to any disclaimer, the term of this patent is extended or adjusted under 35 U.S.C. 154(b) by 0 days.

(21) Appl. No.: 15/889,344

(22) Filed: Feb. 6, 2018

(65) Prior Publication Data

US 2018/0163148 A1 Jun. 14, 2018

Related U.S. Application Data

(63) Continuation of application No. 15/347,138, filed on Nov. 9, 2016, now Pat. No. 9,920,268, which is a
(Continued)

(51) Int. Cl.
*C10J 3/72* (2006.01)
*B01J 8/00* (2006.01)
(Continued)

(52) U.S. Cl.
CPC .............. *C10J 3/721* (2013.01); *B01J 8/004* (2013.01); *B01J 8/0055* (2013.01); *B01J 8/26* (2013.01);
(Continued)

(58) Field of Classification Search
CPC combination set(s) only.
See application file for complete search history.

(56) References Cited

U.S. PATENT DOCUMENTS 2,603,608 A 7/1952 Lewis et al.
2,619,124 A 11/1952 Bertin et al.
(Continued)

FOREIGN PATENT DOCUMENTS

CA 975643 10/1975
CA 2820091 A1 2/2010
(Continued)

OTHER PUBLICATIONS

Hall et al., "Installation and Operation of Sorbathene Solvent Vapor Recovery Units to Recover and Recycle Volatile Organic Compounds at Operating Sites Within the Dow Chemical Company," Proceedings from the Sixteenth National Industrial Energy Technology Converence, Houston, TX (Apr. 13-14, 1994).
(Continued)

*Primary Examiner* — Kaity V Chandler
(74) *Attorney, Agent, or Firm* — Womble Bond Dickinson (US) LLP

(57) ABSTRACT

A solids circulation system receives a gas stream containing char or other reacting solids from a first reactor. The solids circulation system includes a cyclone configured to receive the gas stream from the first reactor, a dipleg from the cyclone to a second reactor, and a riser from the second reactor which merges with the gas stream received by the cyclone. The second reactor has a dense fluid bed and converts the received materials to gaseous products. A conveying fluid transports a portion of the bed media from the second reactor through the riser to mix with the gas stream prior to cyclone entry. The bed media helps manipulate the solids that is received by the cyclone to facilitate flow of solids down the dipleg into the second reactor. The
(Continued)

second reactor provides additional residence time, mixing and gas-solid contact for efficient conversion of char or reacting solids.

16 Claims, 11 Drawing Sheets

Related U.S. Application Data continuation of application No. 14/657,654, filed on Mar. 13, 2015, now Pat. No. 9,550,950, which is a continuation of application No. 13/289,833, filed on Nov. 4, 2011, now Pat. No. 9,011,561.

(60) Provisional application No. 61/410,857, filed on Nov. 5, 2010.

(51) Int. Cl.
    *B01J 8/26*     (2006.01)
    *B01J 8/38*     (2006.01)
    *C10J 3/48*     (2006.01)
    *C10J 3/46*     (2006.01)
    *C10K 1/02*     (2006.01)
    *C01B 3/02*     (2006.01)

(52) U.S. Cl.
CPC ............... *B01J 8/388* (2013.01); *C01B 3/02* (2013.01); *C10J 3/466* (2013.01); *C10J 3/48* (2013.01); *C10J 3/482* (2013.01); *C10J 3/485* (2013.01); *C10J 3/723* (2013.01); *C10K 1/026* (2013.01); *B01J 2208/00132* (2013.01); *B01J 2208/00398* (2013.01); *B01J 2208/00415* (2013.01); *B01J 2208/00752* (2013.01); *B01J 2208/00761* (2013.01); *C10J 2200/09* (2013.01); *C10J 2300/093* (2013.01); *C10J 2300/094* (2013.01); *C10J 2300/0916* (2013.01); *C10J 2300/0946* (2013.01); *C10J 2300/0959* (2013.01); *C10J 2300/0976* (2013.01); *C10J 2300/0983* (2013.01); *C10J 2300/0986* (2013.01); *C10J 2300/1246* (2013.01); *C10J 2300/1261* (2013.01); *C10J 2300/1625* (2013.01); *C10J 2300/1637* (2013.01); *C10J 2300/1687* (2013.01); *C10J 2300/1807* (2013.01); *C10J 2300/1838* (2013.01); *C10J 2300/1846* (2013.01); *C10J 2300/1853* (2013.01); *C10J 2300/1892* (2013.01); *Y02P 20/13* (2015.11); *Y02P 20/145* (2015.11)

(56) References Cited

U.S. PATENT DOCUMENTS

| | | | |
|---|---|---|---|
| 2,642,895 A | 6/1953 | Bertin et al. | |
| 2,670,011 A | 2/1954 | Bertin et al. | |
| 2,680,665 A | 6/1954 | Atwell | |
| 2,727,535 A | 12/1955 | Linderoth | |
| 2,795,931 A | 6/1957 | Foll | |
| 2,812,635 A | 11/1957 | Foll et al. | |
| 2,825,203 A | 3/1958 | Bertin et al. | |
| 2,903,416 A | 9/1959 | Metrailer | |
| 2,912,821 A | 11/1959 | Horak | |
| 2,929,774 A | 3/1960 | Smith | |
| 3,039,955 A | 6/1962 | Honnold, Jr. | |
| 3,674,409 A | 7/1972 | Desty et al. | |
| 3,840,354 A | 10/1974 | Donath | |
| 3,844,733 A | 10/1974 | Donath | |
| 3,853,498 A * | 12/1974 | Bailie ..................... C10B 49/22 201/12 |
| 3,894,562 A | 7/1975 | Moseley, Jr. et al. | |
| 3,910,494 A | 10/1975 | Melton, Jr. | |
| 3,927,996 A | 12/1975 | Knudsen et al. | |
| 3,954,380 A | 5/1976 | Valaev et al. | |
| 3,957,458 A | 5/1976 | Squires | |
| 3,976,592 A * | 8/1976 | Lacey ..................... C10J 3/14 252/372 |
| 4,052,172 A * | 10/1977 | Shirakawa ................ B01J 8/28 201/31 |
| 4,061,562 A | 12/1977 | McKinney et al. | |
| 4,069,024 A | 1/1978 | Fernandes | |
| 4,078,973 A | 3/1978 | Choi et al. | |
| 4,080,149 A | 3/1978 | Wolfe | |
| 4,097,361 A | 6/1978 | Ashworth | |
| 4,105,545 A | 8/1978 | Muller et al. | |
| 4,219,402 A | 8/1980 | DeGeorge | |
| 4,279,710 A | 7/1981 | Coughlin | |
| 4,300,914 A * | 11/1981 | Rice .......................... C10J 3/54 201/31 |
| 4,300,916 A | 11/1981 | Frewer et al. | |
| 4,347,064 A | 8/1982 | Reh et al. | |
| 4,356,151 A | 10/1982 | Woebcke et al. | |
| 4,400,181 A | 8/1983 | Snell et al. | |
| 4,484,885 A | 11/1984 | Machii et al. | |
| 4,519,810 A | 5/1985 | Haas | |
| 4,522,685 A | 6/1985 | Feldmann | |
| 4,532,024 A | 7/1985 | Haschke et al. | |
| 4,569,310 A | 2/1986 | Davis | |
| 4,639,208 A | 1/1987 | Inui et al. | |
| 4,688,521 A | 8/1987 | Korenberg | |
| 4,697,358 A | 10/1987 | Kitchen | |
| 4,857,084 A | 8/1989 | Robbins et al. | |
| 4,909,914 A | 3/1990 | Chiba et al. | |
| 4,959,009 A | 9/1990 | Hemsath | |
| 5,059,404 A | 10/1991 | Mansour et al. | |
| 5,064,444 A | 11/1991 | Kubiak et al. | |
| 5,125,965 A | 6/1992 | Sebenik | |
| 5,133,297 A | 7/1992 | Mansour | |
| 5,156,099 A * | 10/1992 | Ohshita ............... F22B 31/0084 110/245 |
| 5,168,835 A | 12/1992 | Last | |
| 5,197,399 A | 3/1993 | Mansour | |
| 5,205,728 A | 4/1993 | Mansour | |
| 5,211,704 A | 5/1993 | Mansour | |
| 5,255,634 A | 10/1993 | Mansour | |
| 5,306,481 A | 4/1994 | Mansour et al. | |
| 5,353,721 A | 10/1994 | Mansour et al. | |
| 5,366,371 A | 11/1994 | Mansour et al. | |
| 5,439,491 A | 8/1995 | Kubiak et al. | |
| 5,473,885 A | 12/1995 | Hunter, Jr. et al. | |
| 5,536,488 A | 7/1996 | Mansour et al. | |
| 5,624,470 A | 4/1997 | Tanca | |
| 5,635,147 A | 6/1997 | Herbert et al. | |
| 5,637,192 A | 6/1997 | Mansour et al. | |
| 5,638,609 A | 6/1997 | Chandran et al. | |
| 5,667,560 A | 9/1997 | Dunne | |
| 5,696,203 A | 12/1997 | Hummel et al. | |
| 5,700,310 A | 12/1997 | Bowman et al. | |
| 5,752,994 A | 5/1998 | Monacelli et al. | |
| 5,800,153 A | 9/1998 | DeRoche | |
| 5,842,289 A | 12/1998 | Chandran et al. | |
| 5,853,548 A | 12/1998 | Piskorz et al. | |
| 5,861,046 A | 1/1999 | Andersson | |
| 5,937,635 A | 8/1999 | Winfree et al. | |
| 6,114,399 A | 9/2000 | Roberts et al. | |
| 6,133,499 A * | 10/2000 | Horizoe ............... F22B 31/045 110/234 |
| 6,149,765 A | 11/2000 | Mansour et al. | |
| 6,216,446 B1 | 4/2001 | Stram | |
| 6,248,297 B1 | 6/2001 | Stine et al. | |
| 6,248,796 B1 | 6/2001 | Jackson et al. | |
| 6,446,428 B1 | 9/2002 | Kaemming et al. | |
| 6,494,034 B2 | 12/2002 | Kaemming et al. | |
| 6,548,197 B1 | 4/2003 | Chandran et al. | |
| 6,584,765 B1 | 7/2003 | Tew et al. | |
| 6,662,550 B2 | 12/2003 | Eidelman et al. | |
| 6,667,022 B2 | 12/2003 | Cole | |
| 6,680,137 B2 | 1/2004 | Paisley | |
| 6,753,353 B2 | 6/2004 | Jackson et al. | |
| 6,758,032 B2 | 7/2004 | Hunter et al. | |

(56) References Cited

U.S. PATENT DOCUMENTS

| | | |
|---|---|---|
| 6,793,174 B2 | 9/2004 | Ouellette et al. |
| 6,824,383 B2 | 11/2004 | Cain |
| 6,863,878 B2 | 3/2005 | Klepper |
| 6,883,543 B2 | 4/2005 | Tew et al. |
| 6,923,004 B2 | 8/2005 | Chandran et al. |
| 6,931,833 B2 | 8/2005 | Lupkes |
| 6,938,588 B2 | 9/2005 | Jacobsen et al. |
| 6,997,118 B2 | 2/2006 | Chandran et al. |
| 7,047,724 B2 | 5/2006 | Nordeen et al. |
| 7,214,720 B2 | 5/2007 | Bayle et al. |
| 7,220,390 B2 | 5/2007 | Tonkovich et al. |
| 7,309,378 B2 | 12/2007 | Bancon et al. |
| 7,434,401 B2 | 10/2008 | Hayashi |
| 7,526,912 B2 | 5/2009 | Tangirala et al. |
| 7,531,014 B2 | 5/2009 | Chandran |
| 7,569,086 B2 | 8/2009 | Chandran |
| 7,572,362 B2 | 8/2009 | Freel et al. |
| 7,601,303 B1 | 10/2009 | Karer et al. |
| 7,637,096 B2 | 12/2009 | Razzell et al. |
| 7,735,311 B2 | 6/2010 | Eidelman et al. |
| 7,739,867 B2 | 6/2010 | Kenyon et al. |
| 7,758,334 B2 | 7/2010 | Shimo et al. |
| 7,775,460 B2 | 8/2010 | Berg et al. |
| 7,784,265 B2 | 8/2010 | Rasheed et al. |
| 7,828,546 B2 | 11/2010 | Wiedenhoefer et al. |
| 7,836,682 B2 | 11/2010 | Rasheed et al. |
| 7,841,167 B2 | 11/2010 | Rasheed et al. |
| 7,842,110 B2 | 11/2010 | Mansour et al. |
| 7,857,995 B2 | 12/2010 | Johnson et al. |
| 7,879,919 B2 | 2/2011 | Ernst et al. |
| 7,882,926 B2 | 2/2011 | Fullerton |
| 7,886,866 B2 | 2/2011 | Fullerton |
| 7,905,990 B2 | 3/2011 | Freel |
| 7,914,280 B2 | 3/2011 | Schlote et al. |
| 7,950,219 B2 | 5/2011 | Tangirala et al. |
| 7,964,004 B2 | 6/2011 | Koch et al. |
| 7,980,056 B2 | 7/2011 | Rasheed et al. |
| 8,007,688 B2 | 8/2011 | Dahlin et al. |
| 8,082,724 B2 | 12/2011 | Hirata et al. |
| 8,083,494 B2 | 12/2011 | Laforest et al. |
| 8,084,656 B2 | 12/2011 | Feldmann |
| 8,136,624 B2 | 3/2012 | Fullerton |
| 8,137,655 B2 | 3/2012 | Chornet et al. |
| 8,168,686 B2 | 5/2012 | Blevins et al. |
| 8,205,433 B2 | 6/2012 | Boespflug et al. |
| 8,302,377 B2 | 11/2012 | Rasheed et al. |
| 8,312,706 B2 | 11/2012 | Laforest et al. |
| 8,356,467 B2 | 1/2013 | Sprouse et al. |
| 8,381,527 B2 | 2/2013 | LaForest et al. |
| 8,539,752 B2 | 9/2013 | Brumerg et al. |
| 8,580,152 B2 | 11/2013 | Sutradhar et al. |
| 8,585,789 B2 | 11/2013 | Sutradhar et al. |
| 8,707,674 B2 | 4/2014 | Moscinski et al. |
| 8,721,299 B2 | 5/2014 | Koch et al. |
| 8,726,800 B2 | 5/2014 | Murray et al. |
| 8,813,474 B2 | 8/2014 | Daniau et al. |
| 8,889,746 B2 | 11/2014 | Kresnyak |
| 8,894,885 B2 | 11/2014 | Bell et al. |
| 8,899,010 B2 | 12/2014 | Kenyon et al. |
| 8,955,303 B2 | 2/2015 | Brzek et al. |
| 8,968,433 B2 | 3/2015 | Chandran |
| 9,080,513 B2 | 7/2015 | Ziminsky et al. |
| 9,084,978 B2 | 7/2015 | Peters |
| 9,140,456 B2 | 9/2015 | Kenyon et al. |
| 9,217,569 B2 | 12/2015 | Prade |
| 9,227,790 B2 | 1/2016 | Perez |
| 9,268,048 B2 | 2/2016 | Fullerton |
| 9,279,503 B2 | 3/2016 | DiSalvo et al. |
| 9,359,973 B2 | 6/2016 | Farshchian et al. |
| 9,512,997 B2 | 12/2016 | Zettner |
| 9,738,579 B2 | 8/2017 | Lucas et al. |
| 2002/0066396 A1* | 6/2002 | Torii ............... F23C 6/045 |
| | | 110/346 |
| 2002/0142172 A1 | 10/2002 | Brinker et al. |
| 2003/0143126 A1 | 7/2003 | Samson |
| 2004/0182000 A1 | 9/2004 | Mansour et al. |
| 2005/0050759 A1 | 3/2005 | Chandran et al. |
| 2006/0117952 A1 | 6/2006 | Bancon et al. |
| 2006/0130444 A1 | 6/2006 | Smith et al. |
| 2006/0131235 A1 | 6/2006 | Offeman et al. |
| 2006/0246388 A1 | 11/2006 | Feese et al. |
| 2006/0251821 A1 | 11/2006 | Eidelman |
| 2007/0006528 A1* | 1/2007 | Diebold ............... B01D 29/27 |
| | | 48/197 R |
| 2007/0137435 A1 | 6/2007 | Orth et al. |
| 2008/0023338 A1 | 1/2008 | Stoots et al. |
| 2008/0169449 A1 | 7/2008 | Mundschau |
| 2008/0196308 A1 | 8/2008 | Hutton et al. |
| 2008/0222956 A1 | 9/2008 | Tsangaris et al. |
| 2008/0244976 A1 | 10/2008 | Paisley |
| 2008/0260629 A1 | 10/2008 | Morin et al. |
| 2008/0264254 A1 | 10/2008 | Song et al. |
| 2008/0282892 A1 | 11/2008 | Deckman et al. |
| 2008/0308769 A1 | 12/2008 | Marty et al. |
| 2009/0056537 A1 | 3/2009 | Neumann |
| 2009/0084035 A1 | 4/2009 | Wei |
| 2009/0084036 A1 | 4/2009 | Neumann |
| 2009/0084666 A1 | 4/2009 | Agrawal et al. |
| 2009/0139203 A1 | 6/2009 | Rasheed et al. |
| 2009/0151250 A1 | 6/2009 | Agrawal |
| 2009/0191104 A1 | 7/2009 | Murakami et al. |
| 2009/0217584 A1 | 9/2009 | Raman et al. |
| 2009/0229464 A1 | 9/2009 | Robertson |
| 2009/0232729 A1 | 9/2009 | Genkin et al. |
| 2009/0320446 A1 | 12/2009 | Gutmark et al. |
| 2010/0011955 A1 | 1/2010 | Hufton et al. |
| 2010/0011956 A1 | 1/2010 | Neumann et al. |
| 2010/0018115 A1 | 1/2010 | Wallace et al. |
| 2010/0024300 A1 | 2/2010 | Chornet et al. |
| 2010/0040510 A1 | 2/2010 | Randhava et al. |
| 2010/0051875 A1 | 3/2010 | Chornet et al. |
| 2010/0096594 A1 | 4/2010 | Dahlin et al. |
| 2010/0129691 A1 | 5/2010 | Dooher et al. |
| 2010/0162625 A1* | 7/2010 | Mills ............... C10L 1/02 |
| | | 48/76 |
| 2010/0181539 A1 | 7/2010 | Apanel et al. |
| 2010/0196227 A1 | 8/2010 | Venderbosch et al. |
| 2010/0270505 A1 | 10/2010 | Gallaspy et al. |
| 2010/0273899 A1 | 10/2010 | Winter |
| 2010/0307335 A1 | 12/2010 | Hayward |
| 2011/0031103 A1 | 2/2011 | Deckman et al. |
| 2011/0036014 A1 | 2/2011 | Tsangaris et al. |
| 2011/0047961 A1 | 3/2011 | Kenyon et al. |
| 2011/0047962 A1 | 3/2011 | Keynon et al. |
| 2011/0116986 A1 | 5/2011 | Balint et al. |
| 2011/0139603 A1 | 6/2011 | Booth |
| 2011/0146152 A1 | 6/2011 | Vimalchand et al. |
| 2011/0146285 A1 | 6/2011 | Glaser et al. |
| 2011/0218254 A1 | 9/2011 | Chakravarti |
| 2011/0248218 A1 | 10/2011 | Sutradhar et al. |
| 2011/0250661 A1 | 10/2011 | Sutradhar et al. |
| 2011/0297885 A1 | 12/2011 | Boerrigter et al. |
| 2012/0131901 A1 | 5/2012 | Westervelt et al. |
| 2012/0204814 A1 | 8/2012 | Zhang et al. |
| 2012/0213647 A1 | 8/2012 | Koch et al. |
| 2013/0042595 A1 | 2/2013 | Rasheed et al. |
| 2013/0306913 A1 | 11/2013 | Li et al. |
| 2014/0158940 A1 | 6/2014 | Navaee-Ardeh et al. |
| 2014/0224706 A1 | 8/2014 | Do et al. |
| 2015/0093664 A1 | 4/2015 | Berlowitz et al. |
| 2015/0376510 A1 | 12/2015 | Lucas et al. |
| 2016/0001304 A1 | 1/2016 | Pavel et al. |
| 2017/0058222 A1 | 3/2017 | Lucas et al. |
| 2017/0082067 A1 | 3/2017 | Maqbool |

FOREIGN PATENT DOCUMENTS

| | | |
|---|---|---|
| CN | 2319410 | 5/1999 |
| EP | 2275513 | 1/2011 |
| GB | 1395953 A | 5/1975 |
| WO | WO 93/23709 | 11/1993 |
| WO | WO 00/69994 | 11/2000 |
| WO | WO 03/013714 A1 | 2/2003 |

(56) References Cited

FOREIGN PATENT DOCUMENTS

| | | |
|---|---|---|
| WO | WO 2006/071109 | 7/2006 |
| WO | WO 2007/117590 A2 | 10/2007 |
| WO | WO 2010/096626 A1 | 8/2010 |

OTHER PUBLICATIONS

Office Action dated Feb. 2, 2014, issued in Chinese counterpart application No. 20118006423.6.
Office Action dated Feb. 2, 2014, issued in Chinese counterpart application No. 20118006423.6 English Translation.
Search Report dated Feb. 2, 2014, issued in Chinese counterpart application No. 20118006423.6.
Extended Eourpean Search Report dated May 26, 2014, issued in European counterpart application No. 11838896.6.
International Search Report dated Mar. 20, 2012, issued in counterpart PCT application No. PCT/US2011/059386.
Written Opinion of the International Searching Authority dated Mar. 20, 2012, issued in counterpart PCT application No. PCT/US2011/059386.
International Preliminary Report on Patentability dated Feb. 22, 2013, issued in counterpart PCT application No. PCT/US2011/059386.

\* cited by examiner

SYSTEMS AND METHODS FOR PRODUCING SYNGAS FROM A SOLID CARBON-CONTAINING SUBSTANCE USING A REACTOR HAVING HOLLOW ENGINEERED PARTICLES

RELATED APPLICATIONS

This is a Continuation of U.S. patent application Ser. No. 15/347,138 filed Nov. 9, 2016, now U.S. Pat. No. 9,920,268, which is a Continuation of U.S. patent application Ser. No. 14/657,654, filed Mar. 13, 2015, now U.S. Pat. No. 9,550,950, which is a Continuation of U.S. patent application Ser. No. 13/289,833, filed Nov. 4, 2011, now U.S. Pat. No. 9,011,561, which claims priority to U.S. Provisional Patent Application No. 61/410,857, filed Nov. 5, 2010. The contents of the aforementioned applications are incorporated by reference in their entirety.

FIELD OF THE INVENTION

The current invention is directed to a solids circulation system to capture and transfer char fines in a syngas or reacting solids in a gaseous stream carried over from a steam reformer/first stage gasifier or a first reactor into a char converter/carbon trim cell (CTC) or second reactor to facilitate enhanced carbon or reactant conversion.

BACKGROUND OF THE INVENTION

Based on processing different feedstock in the steam reformer, it is known that carbon conversion improves with reformer or first stage gasifier operating temperature. Unfortunately, with an increase in reformer operating temperature, for a specified pulsed heater capacity, the throughput decreases. This decrease in throughput is a result of the decrease in temperature difference between the heater tubes and the fluidized bed that occurs with an increase in reformer operating temperature, at a constant pulse heater firing rate. Consequently, the heat dumping rate decreases while the heat required per unit weight of feed increases due to the higher sensible heat requirement. The net result is a decrease in feedstock throughput at higher reformer operating temperatures.

The demands on the pulsed heater metallurgy also become severe with an increase in operating temperature and the feedstock contamination level (type and quantity of contaminants such as S, Cl, metals, etc.). The reformer temperature is usually not increased to its maximum potential but instead is set at a rate lower than the maximum, depending on the feedstock, pulsed heater metallurgy and the process application. This compromise in reformer temperature results in carbon conversion that may not approach the 98%-99% conversion target, if the feedstock fixed carbon content is relatively high and/or the char resulting from devolatilization is relatively less reactive. To ensure high carbon conversion in these cases, an option is to include a char converter or carbon trim cell downstream of the steam reformer secondary cyclone. This converter provides additional residence time and a reactive environment for the char fines caught by the secondary cyclone. This converter operates as a trim fluidized bed with an oxygen containing gas (air or enriched air or oxygen) as the fluidization medium and in a substoichiometric mode to gasify the carbon to primarily CO. The fluidized bed may be of the circulating bed type or turbulent bed type or bubbling bed type. The fluidized bed operating temperature selected may range from 650° C. (or 1,200 F) to 1,200° C. (or 2,192° F.) depending upon the char reaction and ash softening/agglomeration characteristics. Steam is added, as necessary, to facilitate material transfer, regulate temperature in the converter and avoid ash fusion. The products from the converter pass through third stage cyclone for solids retention and recycle and fourth stage cyclone to drop out the fly ash; the CO-rich gas then is blended with the second cyclone off-gas or syngas (comprising primarily $H_2$ and CO) and routed to a heat recovery steam generator (HRSG). The relatively high CO content of the product gas from the char converter helps to compensate for the high $H_2$ content of the steam reformer exit gas and produce a blend that has a $H_2$ to CO ratio of ~2 on a molar basis which is ideal for biofuel production.

SUMMARY OF THE INVENTION

In one aspect, the present invention is directed to a feedstock processing system having a solids circulation system configured to capture and convert reactive solids. The solids circulation system comprises: a first reactor configured to receive a feedstock and, in response to said feedstock, output a first stream via a first conduit, the first stream comprising gas and particulate matter; a second reactor having a dense fluid bed and configured to receive reactive solids comprising a first portion of said particulate matter and also receive bed solids originating from said dense fluid bed; a first riser connected at a first end to the dense fluid bed of the second reactor and at a second end to said first conduit, the first riser configured to convey said bed solids to said first conduit; a first separation device connected to the first conduit and also to a second conduit, the first separation device configured to receive a mixture of said bed solids and said first stream and separate said mixture into an intermediate solids mixture which is conveyed to the dense fluid bed of the second reactor and a first-stage product gas stream which enters the second conduit; a dipleg connected at a first end to the first separation device and at a second end to the second reactor, the dipleg configured to convey the intermediate solids mixture from the first separation device to the dense fluid bed of the second reactor; and a second separation device connected to the second reactor, the second separation device configured to output a second-stage product gas formed in the second reactor, wherein: the first riser, the first separation device, the dipleg and the second reactor together form a solids circulation loop for capturing and converting particulate matter in the first stream.

In another aspect, the present invention is directed to a feedstock processing system having a solids circulation system configured to capture and convert char from a gas stream created by a first reactor. The solids circulation system includes a solids circulation loop comprising: a second reactor; a first riser connected to the second reactor and configured to convey bed solids in a direction away from the second reactor; a first separation device connected to the first reactor and to the first riser; and a dipleg having a first end connected to the first separation device and a second end connected to the second reactor.

In another aspect, the present invention is directed to a method of controlling a feedstock processing system having such a solids circulation system. The method comprises: measuring solids density in the dipleg and, if needed, adjusting fluid flow rate to the riser in response thereto; measuring a pressure drop in the riser and, if needed, adjusting a fluid flow rate to the riser until the measured pressure drop is within the predetermined pressure drop range; and measuring solids density in the dipleg and, if needed, adjust a fluid flow rate to the riser.

BRIEF DESCRIPTION OF THE DRAWINGS

For a better understanding of the present invention and to show how the same may be carried out in practice, reference will now be made to the accompanying drawings, in which.

DETAILED DESCRIPTION

Figure 1:
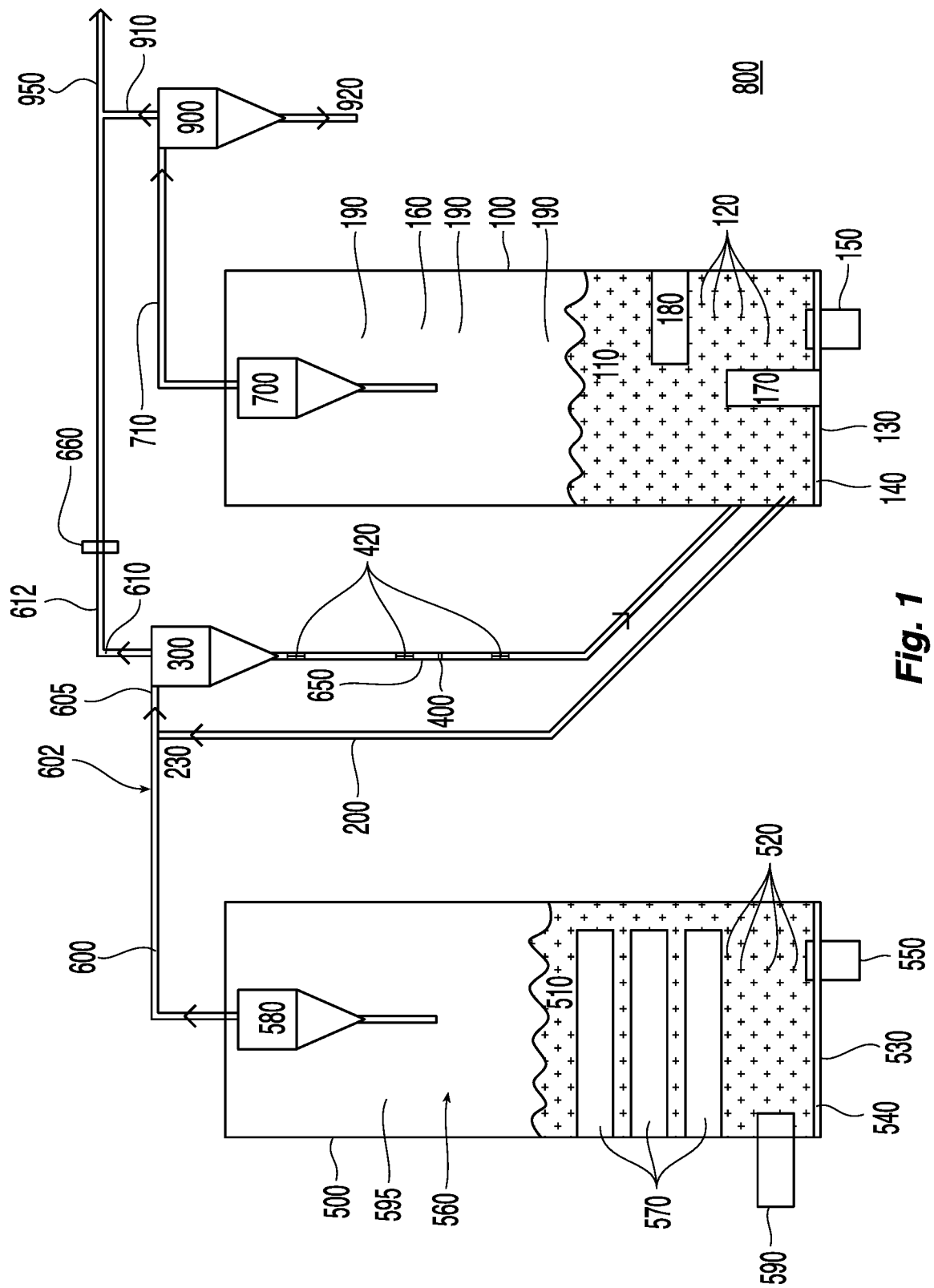
FIG. 1 shows a carbon conversion plant including a carbon trim cell in accordance with one embodiment of the present invention.

FIG. 1 shows a carbon conversion plant 800 including a first reactor 500 and a second reactor 100. In one embodiment, the first reactor 500 is steam reformer or first stage gasifier 500, and the second reactor 100 is a carbon trim cell (CTC) or char converter 100. The output of the steam reformer 500 is sent to a first cyclone 300 ("first separation device"). The carbon trim cell 100 is connected to a riser 200 and a dipleg 400, with the first cyclone 300 connected therebetween. Solids in the carbon trim cell 100 are conveyed through the riser 200 where they merge with output from the steam reformer 500; the solids from the carbon trim cell 100 and the syngas stream 600 from the steam reformer form a mixture that is introduced via a terminal portion 605 of the syngas conduit 602 ("first conduit") into the first cyclone 300; a first portion 410 of the mixture is returned from the first cyclone 300 to the carbon trim cell 100 via the dipleg 400, while a second portion 610 of the mixture is output as a product gas. Thus, a solids circulation loop is formed by the riser 200, the first cyclone 300, the dipleg 400 and the carbon trim cell 100. And in the embodiment of FIG. 1, the loop includes the terminal portion 605 of the first conduit 602.

Figure 2:
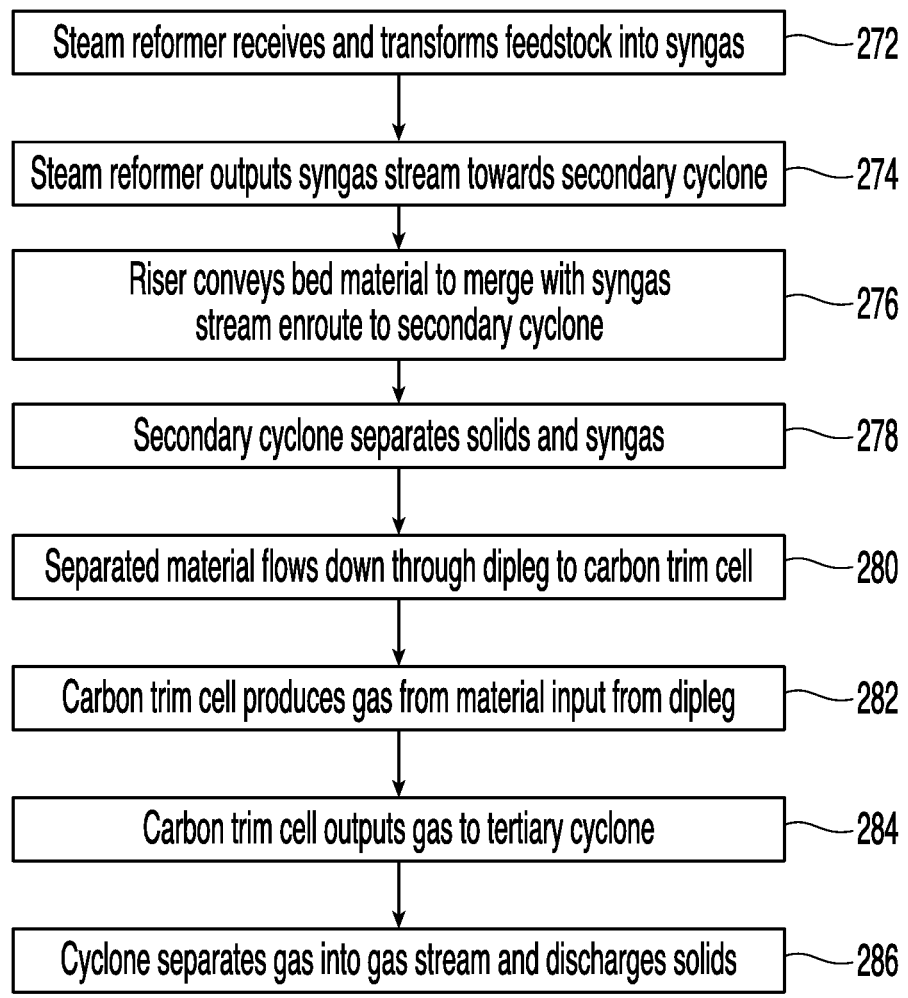
FIG. 2 shows a flow chart of high level operations in the carbon conversion plant with regard to the steam reformer and the carbon trim cell in accordance with one embodiment of the present invention.

FIG. 2 shows a flow chart 270 giving a high level view of the carbon conversion plant operation. The steps depicted are part of a continuous carbon conversion process undertaken in the plant 800. In some embodiments, feedstock 590 can be continuously input into the steam reformer, with the resultant char fines in the syngas undergoing the enhanced carbon conversion process in accordance with one embodiment of the present invention.

In step 272, the steam reformer 500 receives and transforms an input feedstock such as biomass, refuse derived fuel, coal or black liquor 590 into a syngas stream 600 which includes product syngas and char fines. In step 274, the syngas stream 600 is routed via the first conduit 602 in the direction of a first cyclone 300. In step 276, bed solids 120 from the carbon trim cell 100 are conveyed in an upward direction, against gravity, through the riser 200 that merges with the first conduit 602 to form a mixture that travels towards the first cyclone 300. In step 278, the first cyclone 300 separates the mixture of syngas and bed material into an $H_2$-rich first-stage product gas stream 610 containing little fines (conveyed via second conduit 612) and an intermediate solids mixture 650 comprising char particles and bed solids 120 (conveyed via dipleg 400). In step 280, the separated intermediate solids mixture 650 flows down through the dipleg 400 and into the carbon trim cell 100. In step 282, the carbon trim cell 100 produces a CTC product gas containing various particles from the separated solid material received from the dipleg 400. In step 284, a second cyclone 700 ("second separation device") positioned within the carbon trim cell 100 captures and recycles the entrained bed material and unconverted char particles while outputting the solids-laden second-stage product gas 710. In step 286, an external third cyclone 900 ("third separation device") connected to the second cyclone 700 and to the second conduit 612 further separates the solids-laden second-stage product gas 710 into second-stage product gas stream 910 and solids 920 (primarily ash) for discharge. The second-stage product gas stream 910 may be merged with the aforementioned first-stage product gas stream 610 to form the final product gas stream 950, as seen in the figures. In some embodiments, the second-stage product gas stream 910 and the first-stage product gas stream 610 are kept separate and not merged.

Figure 3A:
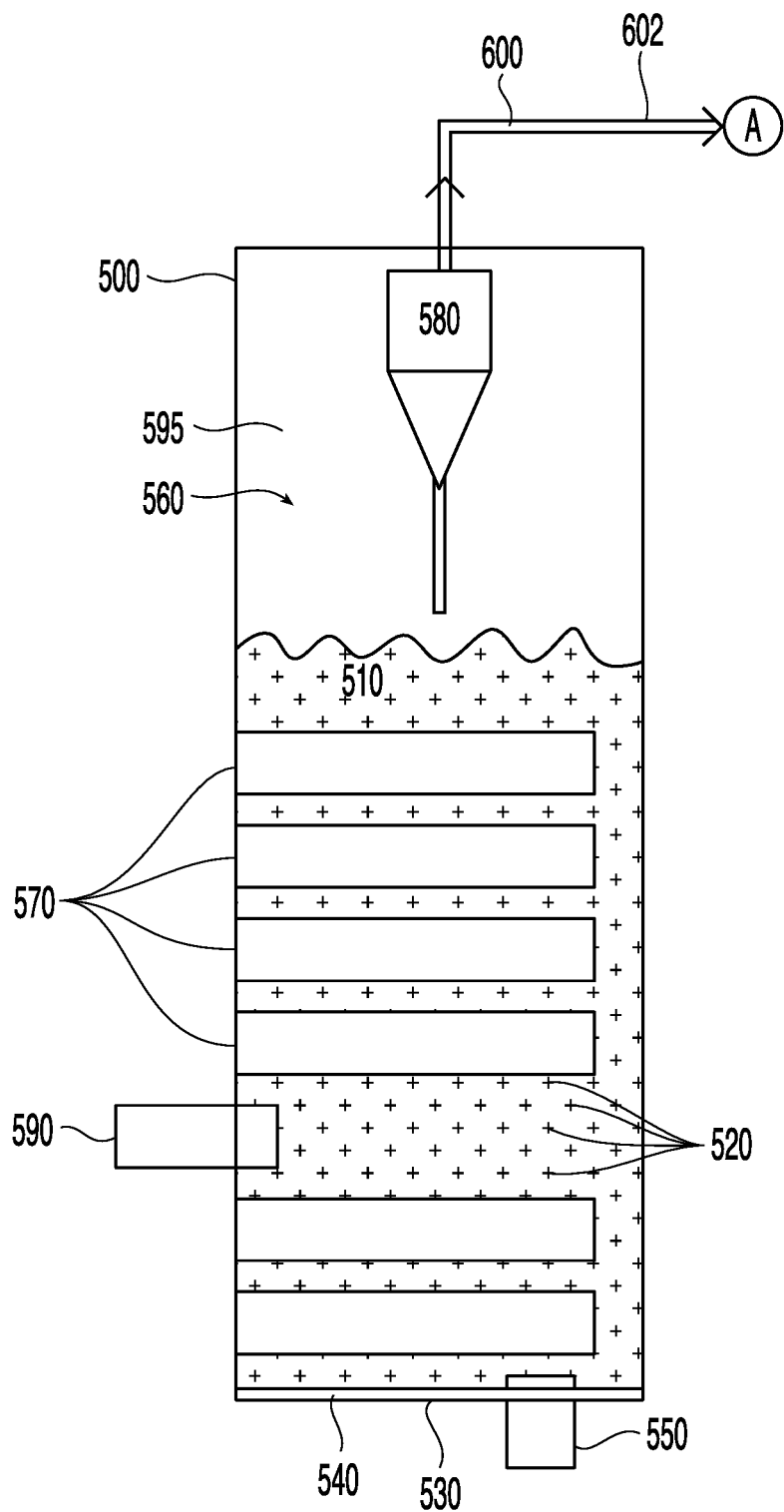
FIG. 3A shows a steam heater used in a carbon conversion plant in accordance with one embodiment of the invention.
Figure 3B:
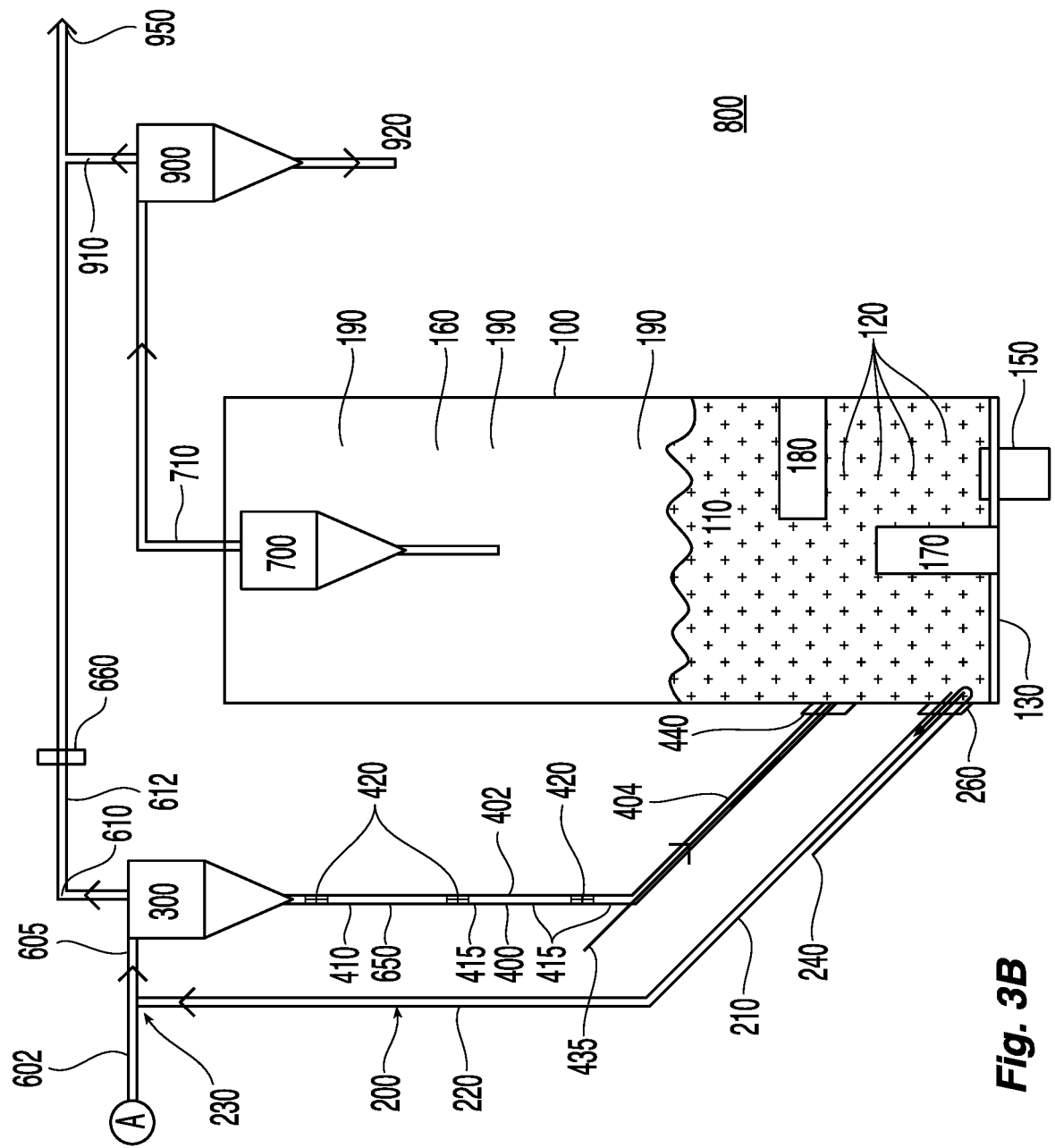
FIG. 3B shows a carbon trim cell in accordance with one embodiment of the invention.
Figure 3C:
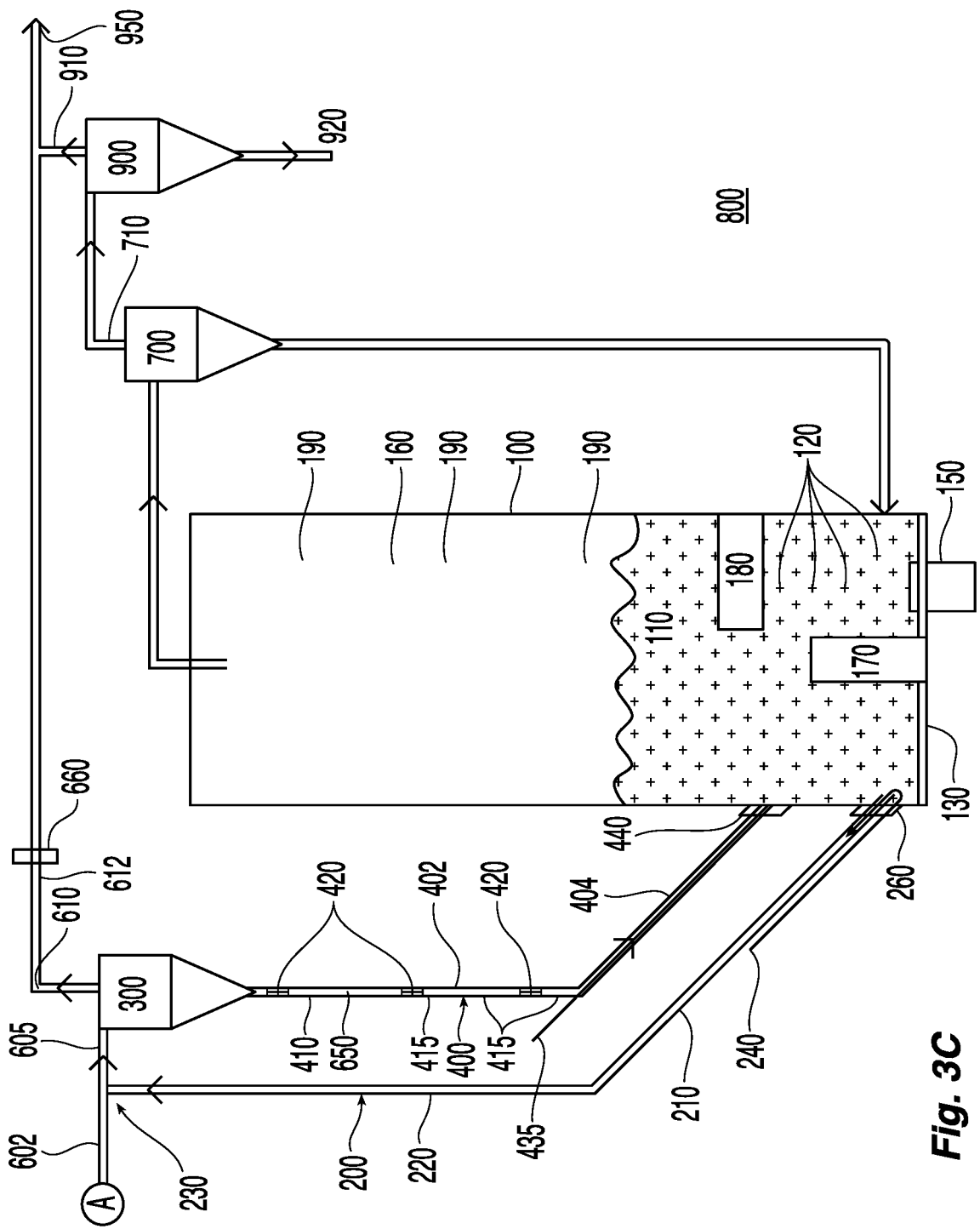
FIG. 3C shows an alternate embodiment of carbon trim cell, having a tertiary cyclone that is located external to the carbon trim cell.

FIGS. 1 and 3B show an embodiment in which the second cyclone 700 is positioned internal to the carbon trim cell 100. It is possible, however, to instead position the second cyclone 700 external to the carbon trim cell 100 with a J-valve or L-valve connection to the CTC to facilitate recycle of the captured bed material and unconverted char, as seen in FIG. 3C.

The first stage gasifier 500 may be a fluidized bed or entrained flow gasifier with or without indirect heating means. FIG. 3A shows one embodiment of a first stage gasifier taking the form of an indirectly heated steam reformer 500. The indirectly heated steam reformer 500 contains a first fluidized bed 510 including first bed material 520 and a first fluidization media 530 supplied through a first distributor 540, a first solids drain system 550, heating conduits 570 which may be, for example, pulse heater tailpipes or electrical heater rods in thermowells, and a steam reformer cyclone 580.

In the embodiment shown in FIG. 3A, the steam reformer cyclone 580 is located internal to the steam reformer 500. In other embodiments (not shown), the steam reformer cyclone 580 may be located external to the steam reformer 500. In some embodiments, some other particle separation device is used in lieu of one or more of the cyclones used in the plant 800. In some embodiments, an alternate gasifier may be used in lieu of a steam reformer 500.

The input feedstock 590 may be carbonaceous or non-carbonaceous. The steam reformer 500 transforms the input feedstock 590 into a mixture 595 of product syngas and char particles. The steam reformer cyclone 580 facilitates the retention or recycle of entrained bed material 520 and the relatively coarser (typically >50 microns) char particles within vessel 500 and routes the syngas stream 600 in the direction of the first cyclone 300 via first conduit 602. In the first cyclone 300, most of the char in the syngas stream 600 drops out and the $H_2$-rich first-stage product gas stream 610 travels onward via a product gas stream conduit 612 ("second conduit") towards to a downstream gas clean up system.

The char is injected into the fluidized bed of the second reactor 100 using an L-valve or J-valve arrangement with aeration. The char in the syngas stream 600 from the steam reformer 500 is generally likely to be fine (typically <50 microns in diameter) and of low density (typically <12 lb/ft$^3$ or 200 kg/m$^3$). Therefore, the char solids may be cohesive, correspond to Geldart Group C particle classification and exhibit poor dense flow characteristics. To ensure a steady or a quasi-steady flow of solids into the carbon trim cell 100, the solids properties in the dipleg are controlled so that they correspond to good dense phase transfer i.e. Geldart A or B particle classification.

The bed solids 120 from the CTC (these are typically Geldart Group B or Group A solids) are conveyed in dilute phase transport mode through a riser 200 to merge with the syngas stream 600 in the first conduit 602 that connects to the first cyclone 300. The conveying fluid may be one or more fluids such as steam, $CO_2$, recycle gas, $N_2$ or air or a combination thereof as appropriate. The CTC bed solids 120 and solids in the syngas stream 600 exiting the steam reformer cyclone 580 are combined and travel along the terminal portion 605 of the first conduit 602 to the first cyclone 300.

At the first cyclone 300, the combined solids are separated from the syngas and flow down through the dipleg 400. Strategically placed aeration ports in the dipleg 400 are employed to aid the solids downflow. The aeration fluid may be one or more fluids such as steam, $CO_2$, recycle gas, $N_2$ or air or a combination thereof as appropriate. One or more slug breakers are employed in the dipleg 400 to break up bubbles and slugs and avoid discontinuous solids downflow. The resulting solids mixture has a higher density and a larger mean size than the char carried over in the syngas stream 600 from the steam reformer 500 and exhibits much improved flow characteristics.

In this manner, the first cyclone 300, dipleg 400 and riser 200 are operated as a solids circulation system to capture and transfer char fines carried over from the steam reformer into the CTC 100 to facilitate carbon conversion.

The carbon trim cell 100 provides additional residence time and a reactive environment for the char fines in the syngas stream 600 caught by the first cyclone 300. The carbon trim cell 100 operates in an auto-thermal or partial oxidation mode to convert the carbon-laden particles in the syngas stream 600 to a solids-laden second-stage product gas 710 that may contain CO, $CO_2$, $H_2$, $H_2O$, and other resultant gases.

In some embodiments, the carbon trim cell 100 may operate in a fuel lean mode to combust the carbon in the char and in which case the resulting solids-laden second-stage product gas 710 will be routed separately from the syngas 610 for downstream processing and not be combined therewith, as depicted in FIGS. 1 and 3B.

In some embodiments, the carbon trim cell 100 may operate in a non-catalytic regime; in other embodiments, the carbon trim cell 100 may operate in a catalytic regime.

In one embodiment, the syngas stream 600 from the steam reformer 500 includes tars which are condensable organic compounds and aromatic hydrocarbons. The quantity and composition of tars in the syngas stream 600 will depend upon the design and operating conditions of the first stage gasifier 500 or indirectly heated fluidized bed 510, feedstock 590 type and properties, and the feedstock injection uniformity and distribution. If the tar fraction of the syngas stream 600 is significant, the tars are captured in a cold gas cleanup train (not pictured), separated, and injected into the carbon trim cell 100 for thermal and/or catalytic decomposition. In other embodiments, streams other than tars may be injected into the carbon trim cell 100 for carbon conversion.

As seen in the embodiment of FIG. 3B, the carbon trim cell 100 comprises a dense fluid bed 110 including second bed solids 120, a second fluidization media distributor 140 and a second solids drain system 150. The second fluidization media 130 enters through the second distributor 140 and may comprise an oxygen-containing gas such as air, enriched air or oxygen and tempering medium such as steam, $CO_2$, $N_2$, or a mixture thereof. The carbon trim cell 100 also includes a second cyclone 700 that is positioned internal to the carbon trim cell 100 in the latter's freeboard 160. The carbon trim cell 100 may include heating conduits 170 to provide heat for startup and/or cooling pipes 180 to control bed operating temperature. The cooling pipes 180 may for example employ elevated pressure steam as coolant and superheat this steam so as to keep the pipe wall temperature relatively hot and minimize char particle quench.

As seen in the embodiment of FIG. 3C, the second cyclone 700 is positioned external to the carbon trim cell 100.

Fluidization medium such as air, enriched air, oxygen, steam, $CO_2$, $N_2$, or a mixture thereof enters the dense fluid bed 110 through the distributor 140. The dense fluid bed 110 may contain inert material or catalyst or sorbent or engineered particles. The engineered particles may be hollow; for example, alumina, zirconia, alumina bubbles, sand, olivine sand, limestone, dolomite, and metal catalysts can be used as the engineered particles. These engineered particles enhance mixing, heat and mass transfer, and reaction between the char collected from the syngas stream 600 and the fluidization medium 130. In some embodiments, the bed solids include Geldart Group A or Group B solids.

The dense fluid bed 110 may be a circulating bed type, turbulent bed type or a bubbling bed type. The temperature of the dense fluid bed 110 within the carbon trim cell 100 will depend on the nature of the char generated by the steam reformer 500 and collected from the syngas stream 600. The carbon trim cell dense fluid bed temperature may range between 650 and 1,200° C. (~1,200 and 2,200° F.) depending upon the reactivity, size and ash fusion characteristics of the char in the syngas stream 600. In some embodiments, a bed temperature on the order of 1,000° C. (1,832° F.) can be reached. Steam is added to the carbon trim cell 100 through the distributor 140, as necessary, to facilitate material transfer, regulate temperature in the carbon trim cell 100, and avoid ash fusion and bed media agglomeration.

The freeboard 160 provides an entrained solids flow zone to improve carbon conversion. Multiple fluid addition stages 190 in the freeboard 160 above the dense fluid bed 110 may be included to promote intimate gas-solid contact and promote carbon conversion reactions. The fluid addition stages can include the addition of air, enriched air, oxygen, and/or steam. Sorbents such as lime may also be added to the carbon trim cell 100 to capture sulfur and other contaminants. In one embodiment, sorbents may be added to the carbon trim cell 100 and the spent sorbent may be withdrawn and regenerated.

The gas and solids from the freeboard 160 pass through the second cyclone 700 to help retain or recycle the relatively bigger char particles and bed solids 120 in the carbon trim cell 100.

The carbon trim cell 100 operates in an auto-thermal or partial oxidation mode to convert the carbon in the char and the organics in the injected tars to a product gas that may contain CO, $CO_2$, $H_2$, $H_2O$, and other gases. In various embodiments, one or more or all of the following reactions may also take place.

Oxygen reacts exothermically (releases heat): 1) with the carbonaceous components (char in intermediate solids mixture 650 and tars) to produce carbon monoxide and carbon dioxide; 2) with hydrogen to produce water vapor; and 3) with carbon monoxide to produce carbon dioxide:

$$C + xO_2 \rightarrow yCO + (x-y/2)CO_2 + \text{Heat}$$

$$H_2 + \tfrac{1}{2}O_2 \rightarrow H_2O + \text{Heat}$$

$$CO + \tfrac{1}{2}O_2 \rightarrow CO_2 + \text{Heat}$$

Superheated steam reacts endothermically (consumes heat) with the carbonaceous components (char in intermediate solids mixture 650 and tars) to produce hydrogen and carbon monoxide fuel gases (synthesis gas):

$$H_2O + C + \text{Heat} \rightarrow H_2 + CO \text{ (steam reforming)}$$

Further, carbon dioxide reacts endothermically (consumes heat) with the carbonaceous components (char in intermediate solids mixture 650 and tars) to produce carbon monoxide:

$$CO_2 + C + \text{Heat} \rightarrow 2CO \text{ (dry reforming or Boudouard)}$$

A water-gas shift reaction can also occur simultaneously with the steam reforming reaction to yield additional hydrogen and carbon dioxide:

$$H_2O + CO \rightarrow H_2 + CO_2 + \text{Heat (water-gas shift)}$$

Other secondary reactions may also take place:

$$CO + 3H_2 \rightarrow CH_4 + H_2O + \text{Heat (methanation)}$$

$$C + 2H_2 \rightarrow CH_4 + \text{Heat (hydrogasification)}$$

$$H_2O + C + \text{Heat} \rightarrow \tfrac{1}{2}CH_4 + \tfrac{1}{2}CO_2 \text{ (gasification)}$$

The solids-laden second-stage product gas 710 from the carbon trim cell 100 contains fine particulate matter (primarily ash with residual carbon), and passes through the external third cyclone 900. The external third cyclone 900 provides separation of the solids-laden second-stage product gas into a second-stage product gas stream 910 which is typically rich in CO and fly ash solids 920 for discharge to ash collection and storage. In some embodiments, The CO-rich second-stage product gas stream 910 is blended with the $H_2$-rich first-stage product gas stream 610 and routed to a heat recovery steam generator (HRSG).

The relatively high CO content of the second-stage product gas stream 910 derived from the carbon trim cell 100 helps compensate for the high $H_2$ content of the first-stage product gas stream 610 derived from the steam reformer 500. It becomes feasible to operate the two units 500 and 100 such that the two gases produce a blend that has a $H_2$ to CO ratio of about 2.0 on a molar basis which is ideal for biofuel production.

If necessary, the solid products of reaction (mostly inorganic material) may be discharged from the bottom of the carbon trim cell 100 via the second solids drain system 150. The solid products of reaction may include potassium and phosphorous compounds, if the input feedstock 590 to the steam reformer 500, for example a biomass, initially contained those compounds.

Figure 4:
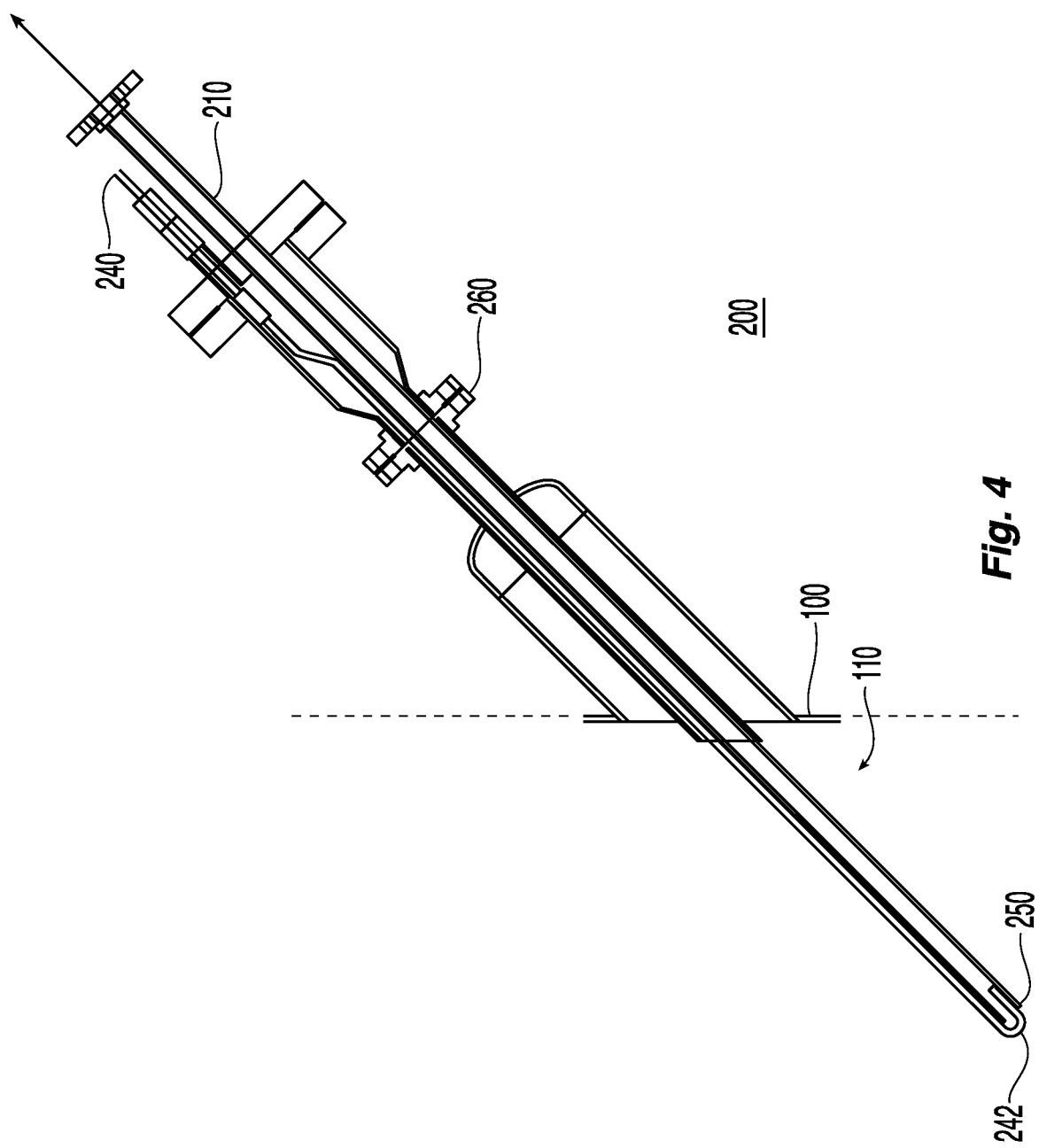
FIG. 4 shows a riser with a fluid injector of the type typically used in the present invention.

The riser 200 is connected between the carbon trim cell 100 and the first conduit 602. As seen in the embodiment of FIG. 3B, the riser 200 includes an upwardly inclined riser entrance section 210 and a vertical riser pipe 220 which is angled relative to the riser entrance section and connects to the first conduit 602 at riser exit 230. The riser entrance section 210 includes a carbon trim cell nozzle 260 at the interface with the carbon trim cell 100. The riser 200 has a conveying fluid inlet 240 which extends along the upwardly inclined riser entrance section 210 and into the carbon trim cell 100. The conveying fluid inlet 240 terminates in a conveying fluid injector 242. As seen in FIG. 4, the conveying fluid injector 242 comprises a bent tip (seen as a "J-shaped" tip in FIG. 4) which is configured to inject conveying fluid into the riser inlet 250 at the lowermost portion of the riser entrance section 210.

Conveying fluid is introduced into the conveying fluid inlet 240 at a point external to the carbon trim cell 100 and exits the conveying fluid injector 242 into the riser inlet 250 within the carbon trim cell 100. The conveying fluid may be one or more fluids such as steam, $CO_2$, recycle gas, $N_2$, air, or a combination thereof as appropriate. The conveying fluid entrains and conveys bed solids 120 in a dilute phase transport mode through the riser entrance section 210 and the riser pipe 220 to the riser exit 230. The entrained bed solids 120 are mixed with the syngas stream 600 in the first conduit 602 prior to entering the first cyclone 300.

The syngas and char in the syngas stream 600 exiting the steam reformer cyclone 580 and the carbon trim cell bed solids 120, after mixing, are separated in the first cyclone 300 into an intermediate solids mixture 650 that flows down through the dipleg 400 to the carbon trim cell 100.

The riser entrance section 210 is located preferably close to the bottom of the dense fluid bed 110. In one embodiment, the riser 200 is inserted into the dense fluid bed 110 such that the riser 200 is not flush with the internal wall of the carbon trim cell dense fluid bed 110 but penetrates the dense fluid bed 110 partially, e.g., between ½" and 12" for example). This allows the riser entrance section 210 to be in the upflowing section of the dense fluid bed 110, facilitating improved entrainment of the bed solids 120 into the riser 200.

As seen in FIG. 3B, the dipleg 400 includes a vertical dipleg first section 402 connecting to and an angled dipleg lower section 404 provided with a dipleg nozzle 440 at the interface with the carbon trim cell 100. In one embodiment, the dipleg nozzle 440 is flush with the internal wall of the carbon trim cell 100 and is aerated with one or more lances 435 to improve solids return/drainage into the dense fluid bed 110.

The dipleg 400 may include at least one or more strategically placed aeration ports 415, at least one or more specially designed slug breakers 420 and one or more expansion joints (not shown). The slug breakers 420, which are found in at least the vertical dipleg section 402, help break up gas bubbles formed in the intermediate solids mixture 650.

Figure 5A:
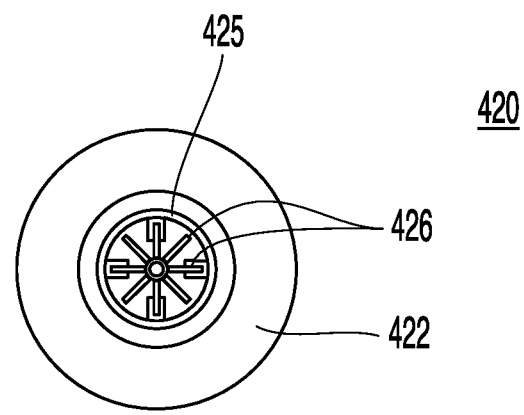
FIGS. 5a and 5b show a top and a side view of a slug breaker of the type typically used in the present invention.
Figure 5B:
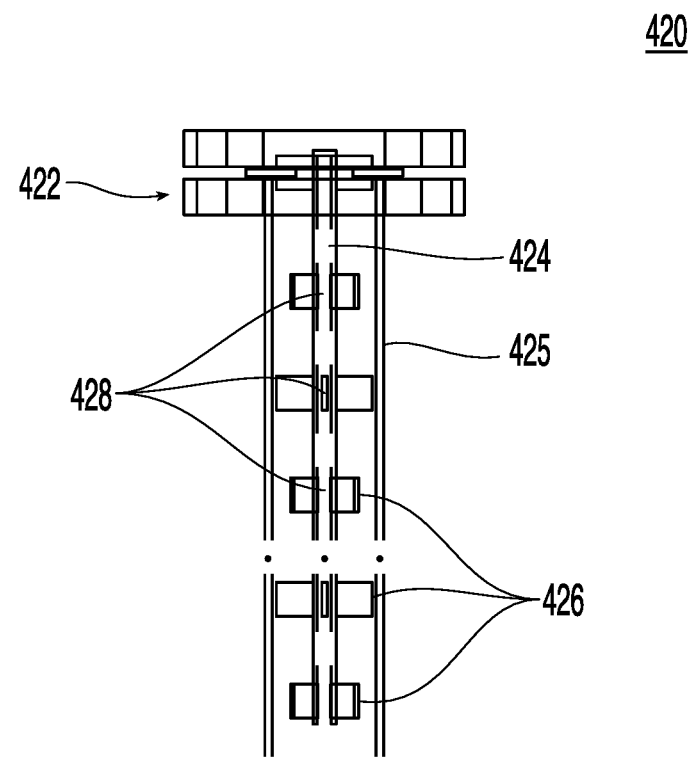

FIGS. 5A and 5B depict a top view and a side view, respectively, of a slug breaker 420 of the sort that may be employed in the dipleg 400. The slug breaker 420 has a substantially cylindrical top portion 422 having a diameter that is substantially similar to the diameter of the vertical dipleg section 402. Connected to the top portion 422 is an elongated shaft 424. Attached to the shaft 424 are a plurality of axially spaced apart sets 428 of circumferentially spaced apart fins 426, each set of fins being staggered in the circumferential direction by a predetermined angle relative to an axially adjacent set of fins. In one embodiment, each set of fins is staggered in the circumferential direction by 45 degrees relative to axially adjacent sets. An annular band 425 may be used to confine radial movement of the fins 426 and prevent damage thereto.

The aeration ports 415 in the dipleg 400 allow for the introduction of one or more lances and/or aeration fluids to aid the flow of the intermediate solids mixture 650 from the first cyclone 300, through the dipleg 400, and into the carbon trim cell 100. The aeration fluid used in the ports 415 may be steam, $CO_2$, recycle gas, $N_2$, air, or a combination thereof as appropriate. In some embodiments, multiple aeration lances are placed vertically apart in the vertical dipleg portion dipleg 402 to promote solids downflow in the dipleg 400.

The particles of the intermediate solids mixture 650 which exit the dipleg nozzle 440 into the carbon trim cell 100 have a higher density and a larger mean size than the char in the syngas stream 600 and exhibit much improved flow characteristics. Thus, the first cyclone 300, the dipleg 400 and riser 200 operate as a solids circulation system to capture and transfer char fines in the syngas stream 600 carried over from the steam reformer 500 into the carbon trim cell 100 to facilitate enhanced carbon conversion.

The riser nozzle 260 and the dipleg nozzle 440 are preferably connected at steep angles to the vertical axis. Nozzles 260 and 440 can be connected to the carbon trim cell 100 at angles of 10 to 45 degrees to the vertical axis. More preferably, the riser and dipleg nozzles 260 and 440 are connected to the carbon trim cell 100 at angles of 20 to 30 degrees, with reference to the vertical axis. The steep angles of nozzle connection facilitate good solids circulation.

FIGS. 1, 3B and 3C depict the riser nozzle 260 and dipleg nozzle 440 emerging from the same side of the carbon trim cell 100. In more likely embodiments, however, the riser nozzle 260 and dipleg nozzle 440 are placed at least 90 degrees apart circumferentially. More preferably, the riser nozzle 260 and the dipleg nozzle 440 are placed 180 degrees apart circumferentially. Circumferentially spacing apart the two nozzles 260, 440 helps mitigate cross flow or short-circuiting of char fines. In some embodiments, the dipleg nozzle 440 is placed at a higher elevation in the dense fluid bed 110 than the riser nozzle 260. Preferably, the riser nozzle 260 is placed between $1/12$ and $1/4$ of the dense fluid bed 110 height, whereas the dipleg nozzle 440 is placed between $1/10$ and $1/3$ of the dense fluid bed 110 height.

A restriction orifice 660 may be positioned in the second conduit, downstream of the first cyclone 300 and upstream of the third cyclone 900. The restriction orifice 660 helps ensure that the pressure drops from the riser entrance 210 to the combined exit 950 for flows along the two flow paths or branches are equal. In other words, a first pressure drop across a first flow path comprising: the dense fluid bed 110 above the riser inlet 250, the freeboard 160 region of the CTC 100, the second cyclone 700, the external third cyclone 900 and connected piping; should be approximately equal to a second pressure drop across a second flow path comprising: riser 200, first cyclone 300, restriction orifice 660 and connected piping.

Design of a system in accordance with the present invention should take into account the pressure balance around the solids circulation loop. The major steps for designing a system having such a pressure balance include:

1. Estimate the char fines carried in the syngas stream 600 from the steam reformer 500 in terms of flow rate, density and particle size distribution;
2. Estimate the riser solids circulation rate required to shift the separated intermediate solids mixture 650 into Geldart Group A (or B if required) particle classification with respect to density and mean particle size;
3. Perform a pressure drop calculation around the riser loop for the first and second flow paths cited above and estimate the pressure drop required at the restriction orifice 660 to balance the pressure drop for the two flow paths; and
4. Perform similar pressure drop calculations from the dipleg discharge at the CTC 100 to the combined exit 950. In other words, (a) calculate a third pressure drop across a third path comprising the dense fluid bed 110 above the dipleg opening into the CTC 100, CTC freeboard 160, CTC second cyclone 700 and CTC external third cyclone 900 and connected piping, (b) calculate a fourth pressure drop across a fourth path comprising the dipleg 400, first cyclone 300, restriction orifice 660 and connected piping, (c) estimate the solids level or height required in the dipleg to balance the pressure drop for flow through the third and fourth flow paths, and (d) if the solids level calculated above is not acceptable, revise either the restriction orifice pressure drop or the riser inlet elevation or location in the second reactor and repeat the calculations until the design is satisfactory.

A riser fluid controller (not shown), a dipleg fluid controller (not shown) and a carbon trim cell controller (not shown) may receive input from sensors (not shown) and send signals to various actuators (not shown) associated with the various system components to control the above-described system.

The sensors may be placed at least in the carbon trim cell 100, the riser 200, first cyclone 300, and the dipleg 400 to monitor at least the level and density of solids in the dipleg 400 and the first cyclone 300. In one embodiment, these sensors continually transmit information to a carbon trim cell controller that stores the information. In one embodiment, sensors on the riser 200 transmit their readings to a riser fluid controller and sensors on the dipleg 400 transmit their readings to the dipleg fluid controller. The sensors can transmit the information wirelessly, via wires, or by any other technology available to transmit the information. Using the sensors, the fluid flow to the riser 200 and the aeration rate in the dipleg 400 are adjusted to regulate the transfer of the intermediate solids mixture 650 to the carbon trim cell 100 and maintain the level and density of intermediate solids mixture 650 in the dipleg 400 in a narrow range to optimize carbon conversion in the carbon trim cell. The riser fluid controller controls the flow of riser fluid in the riser 200. Similarly, the dipleg flow controller controls the flow of fluid in the dipleg 400. In one embodiment, the riser fluid controller is connected to the riser 200 and to the sensors associated with the riser 200. Similarly, the dipleg fluid controller is connected to the dipleg 400 and to the sensors associated with the dipleg 400. When the sensors convey readings outside an acceptable range, the controllers adjust the flow in the riser 200 and dipleg 400 as necessary.

Figure 6:
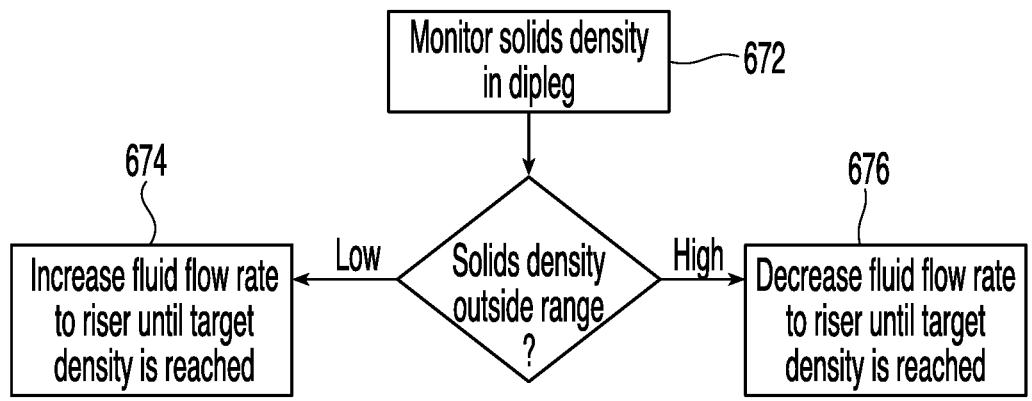
FIG. 6 presents a flow chart for monitoring and controlling solids density in the dipleg.
Figure 7:
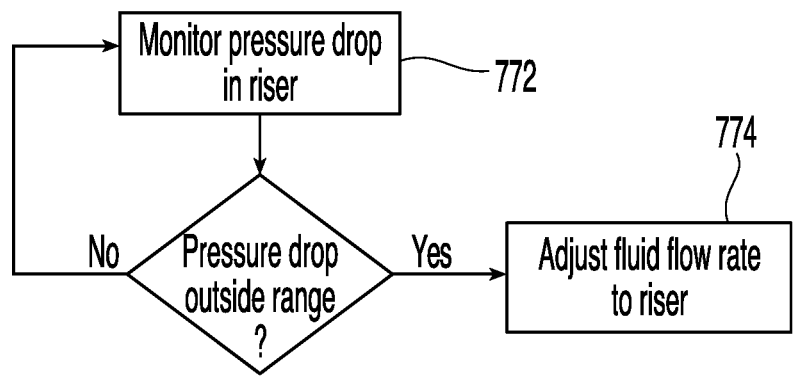
FIG. 7 presents a flow chart for monitoring and controlling pressure drop in the riser.
Figure 8:
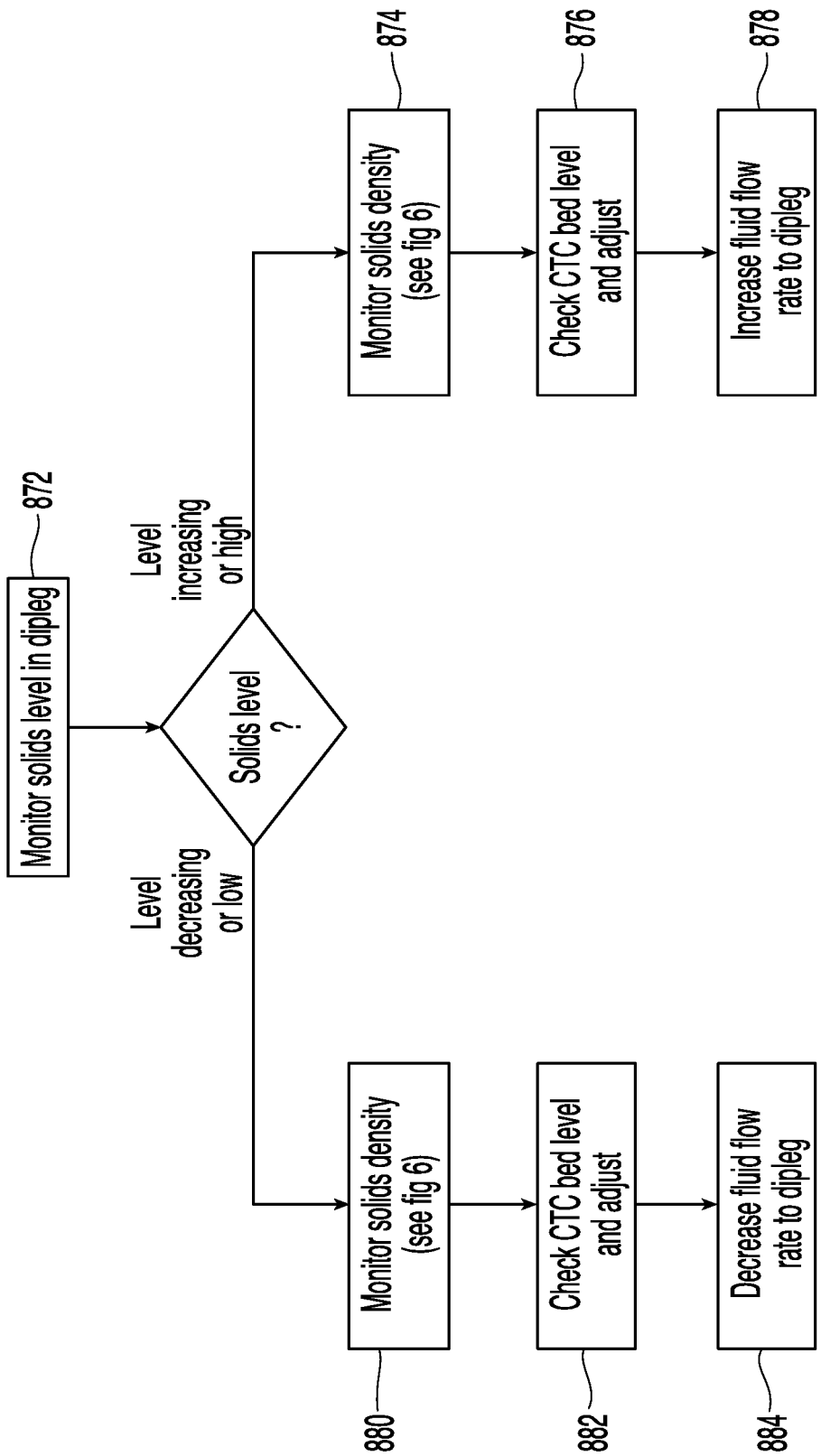
FIG. 8 presents a flow chart for monitoring and controlling solids level in the dipleg.

FIGS. 6, 7, and 8 depict flow charts that show the procedures by which the controllers regulate the flows in the riser 200 and dipleg 400 to ensure that the operation of the carbon trim cell 100 is maintained within normal ranges. In general, the fluid flow to the riser 200 and the aeration rate in the dipleg 400 can be adjusted to regulate the transfer of the intermediate solids mixture 650 to the CTC 100 and maintain the solids level and density in the dipleg 400 in a narrow range.

FIGS. 6 and 7 depict the operating procedure for controlling the solids density in the dipleg 400. The nominal target bulk density for example may be 20 lb/ft³ or 320 kg/m³. However, a predetermined acceptable range for bulk density can range from 10 to 60 lb/ft³ or from 160 to 960 kg/m³, depending upon the feedstock and CTC bed solids properties, with an acceptable operating deviation of about +/−5 lb/ft³ or 80 kg/m³.

In step 672, the solids density in the dipleg is monitored. If the solids density in the dipleg 400 is lower than the predetermined acceptable range, the fluid flow rate to the riser 200 is increased gradually until the predetermined acceptable range is reached, as depicted in step 674. If, on the other hand, the solids density in the dipleg 400 is higher than the predetermined acceptable range, the fluid flow rate to the riser 200 is decreased gradually until the predetermined acceptable range is reached, as depicted in step 676. However, the total fluid flow rate to the riser 200 should not be decreased below a predetermined minimum threshold value so as to avoid potential injector plugging.

The pressure drop in the riser 200 is a good indicator of the solids circulation rate. Therefore, this should be monitored periodically and the fluid flow to the riser should be kept as low as possible consistent with the solids density target range specified above. As seen in step 772, the pressure drop in the riser 200 is monitored from time to time. If the pressure drop is outside a predetermined range, then the fluid flow rate to the riser is adjusted, as depicted in step 774.

FIG. 8 depicts the operating procedure for controlling the solids level in the dipleg 400. The nominal target level may be for example z feet (z may range from 3 to 60 ft, depending upon the plant throughput, size, feedstock and CTC bed solids properties) with an acceptable deviation of about +/−y feet (y may range from 0.5 to 10 ft, depending upon the plant throughput, size, feedstock and CTC bed solids properties).

In step 872, the solids level in the dipleg 400 is monitored.

If the solids level is rising or higher than a predetermined target range, then steps 874, 876 and 878 may be carried out. In step 874, the solids density is checked and, if needed, brought into the proper range as performed in the steps of FIG. 6. In step 876, the bed level of the dense fluid bed 110 of the CTC 100 is checked and, if needed, adjusted to bring it within the operating range. Finally, in step 878, the fluid flow rate to the dipleg 400 is increased gradually until the predetermined target range is reached.

If the solids level is falling or lower than the predetermined target range, then steps 880, 882 and 884 may be carried out. In step 880, the solids density is checked and, if needed, brought into the proper range as performed in the steps of FIG. 6. In step 882, the bed level of the dense fluid bed 110 of the CTC 100 is checked and, if needed, adjusted to bring it within the operating range. Finally, in step 884, the fluid flow rate to the dipleg 400 is decreased gradually until the predetermined target range is reached. However, the fluid flow rate should not be decreased below a predetermined minimum threshold value so as to avoid plugging of the aeration ports 415.

Figure 9:
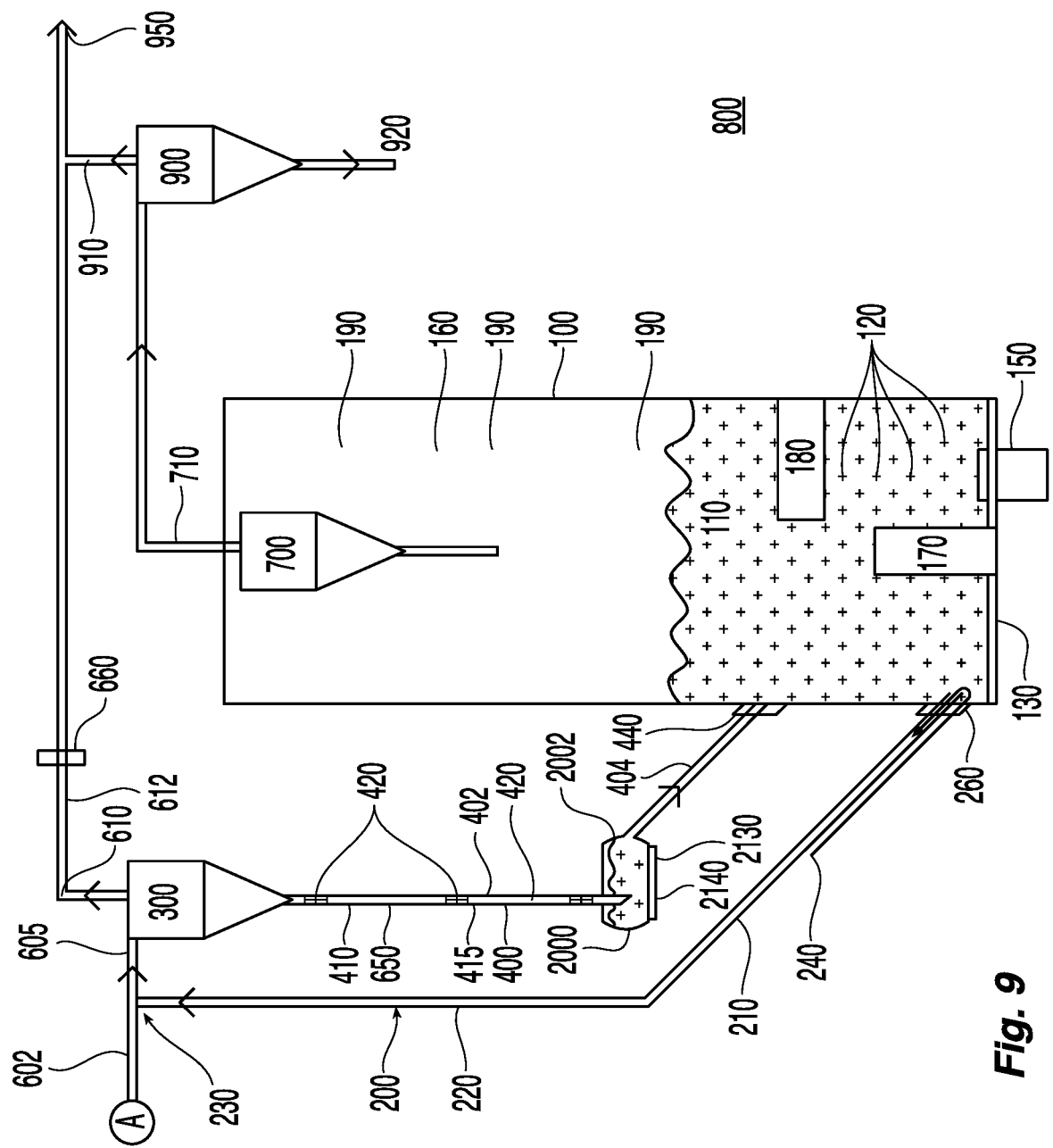
FIG. 9 shows an embodiment in which a gas-solids flow regulator is inserted in the dipleg path.

FIG. 9 shows an embodiment of solids circulation loop that is slightly different from the embodiment seen in FIG. 3B. In FIG. 9, a gas-solids flow regulator 2000 is interposed between the vertical dipleg first section 402 and the angled dipleg lower section 404. The gas-solids flow regulator 2000 is equipped with a fluidization media distributor 2140 and a fluidization media inlet 2130 configured to accept a fluidization media which may comprise steam or recycled syngas or $CO_2$ or $N_2$, or a mixture thereof; however, steam or recycled syngas or tail gas is preferred.

The fluidization media distributor 2140 may be biased in the sense that it preferentially provides a greater flow of fluidization media 2130 to the vicinity closer to the angled dipleg lower section 404 than near the vertical dipleg first section 402. It is preferred to have a greater superficial fluidization velocity nearby the vicinity where the angled dipleg lower section 404 conveys the intermediate solids mixture 650 from the vessel and to the second reactor 100 in relation to the vicinity within the vessel where the intermediate solids mixture 650 is transferred to the vessel from the first separation device 300; this is because downward transference of solids is improved with increased fluidization, and gas bypassing up the vertical dipleg first section 402 is minimized with a lower fluidization velocity. Typically, the superficial fluidization velocity may range from slightly less than minimum fluidization velocity to less than two times the minimum fluidization velocity.

The fluidization media 2130 allows the intermediate solids mixture 650 to flow in a dense-phase transport mode en route to the carbon trim cell 100, thus improving solids transfer while circumventing the propensity for clogging and slug flow. This may also aid in minimizing gas leakage or backflow from the second reactor 100 to and through the first separation device 300.

It is preferable to maintain a constant level 2002 of solids within the gas-solids flow regulator 2000 by regulating fluidization and aeration flow rates to ensure steady flow of intermediate solids mixture 650 into the carbon trim cell 100. It is also preferable that the vertical dipleg first section 402 is disposed within the gas-solids flow regulator 2000 to transfer the intermediate solids mixture 650 beneath the constant level 2002 of solids to minimize gas bypassing up the vertical dipleg first section 402.

It is also preferable to transfer the intermediate solids mixture 650 from the vertical dipleg first section 402 into the gas-solids flow regulator 2000 such that the opening in the vertical dipleg first section 402 points away from the angled dipleg lower section 404; this is to further minimize gas bypassing up the vertical dipleg first section 402.

Figure 10:
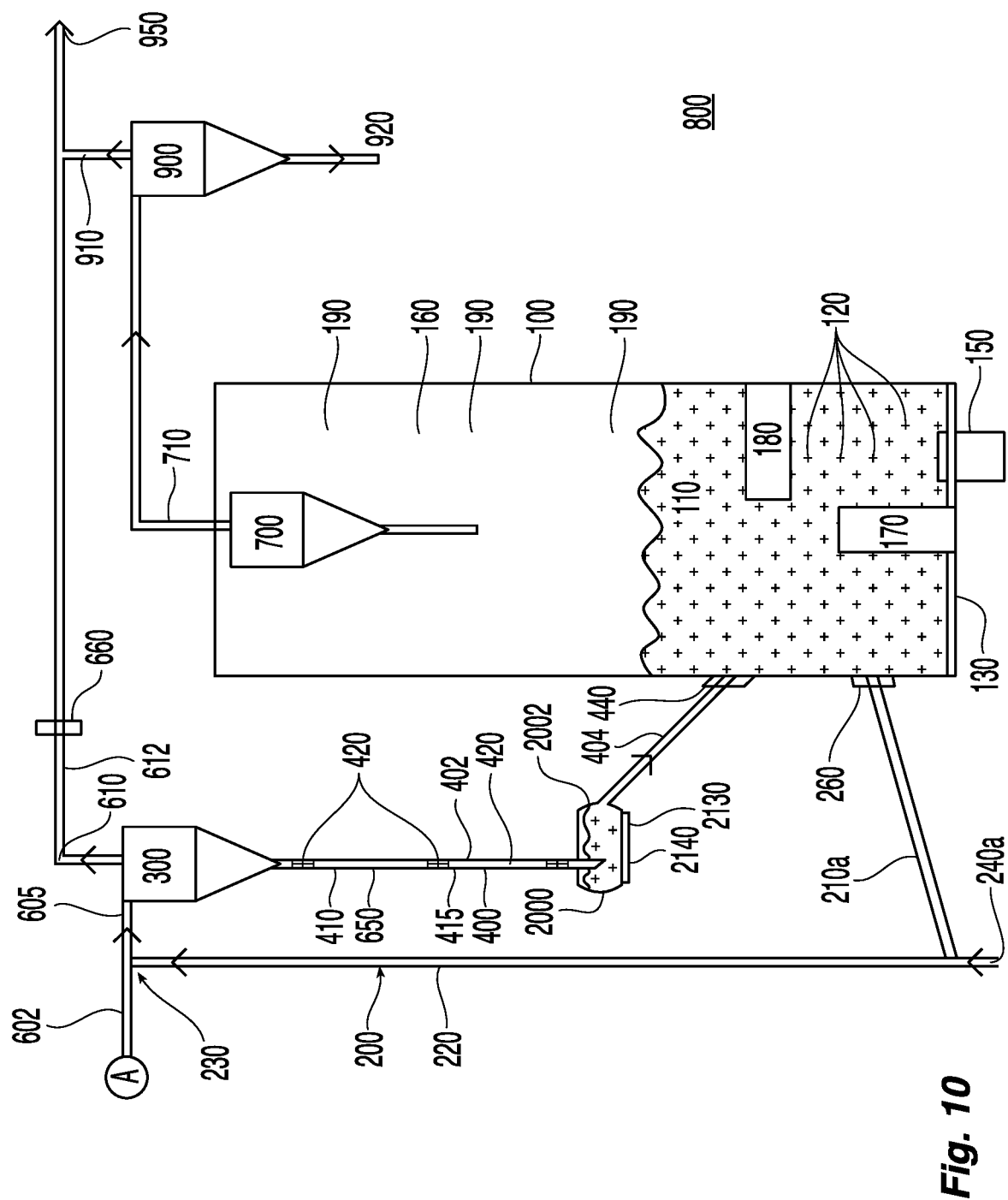
FIG. 10 shows an embodiment similar to FIG. 9 in which the riser is provided with a downwardly inclined entrance section.

FIG. 10 shows an embodiment having a gas-solids flow regulator 2000 of the sort seen in 9. However, FIG. 10 includes a riser embodiment different from that seen in the embodiments of FIGS. 3B, 3C and 9. Here, the riser includes a downwardly inclined entrance section 210a connected to an elongated vertical riser pipe 220 which connects to the first conduit 602 at riser exit 230. The conveying fluid inlet 240a now is located at the bottom of the angled junction between riser entrance section 210a and the vertical riser pipe 220. It can be seen from the embodiment of FIG. 10 that the fluid is injected upward directly into the elongated vertical riser pipe 220.

Although the present invention has been described with reference to certain embodiments, it should be understood that various alterations and modifications could be made without departing from the spirit or scope of the invention as hereinafter claimed.

What is claimed is:

1. A system for processing a carbonaceous feedstock to create product gas, comprising:
    (a) a first reactor (500) having a first fluidized bed (510) and configured to receive a feedstock (590) and superheated steam, and output a syngas stream (600) via a first conduit (602), the syngas stream (600) comprising a first syngas, char, condensable organic compounds and aromatic hydrocarbons, the first fluidized bed (510)

within the first reactor (500) being indirectly heated by a plurality of heating conduits (570), the heating conduits (570) comprising pulse heater tailpipes and/or electrical heater rods; and (b) a second reactor (100) for producing a second syngas comprising carbon monoxide and carbon dioxide from the char produced by the first reactor (500), the second reactor comprising:

(i) a second fluidized bed comprising bed material in the form of hollow engineered particles selected from the group consisting of alumina, zirconia, sand, olivine sand, limestone, dolomite and metal catalyst;

(ii) a freeboard (160) located above a bed level of the second fluidized bed;

(iii) a cyclone (700) positioned within the freeboard (160) of the second reactor (100), the cyclone (700) configured to capture and recycle entrained bed material and char particles to the second fluidized bed, and output a solids-laden second-stage product gas;

(iv) a plurality of fluid addition stages located in the freeboard (160), the plurality of fluid addition stages configured to introduce a mixture of oxygen and superheated steam to the freeboard (160) to promote conversion of char into the second syngas;

(v) a distributor (140) configured to accept and distribute a fluidization media (130) comprising oxygen and superheated steam into the bed material of the second fluidized bed;

(vi) at least one heating conduit (170) that protrudes into the bed material within the second reactor (100) to heat the second fluidized bed; and (vii) a nozzle (440) connected to the second reactor at a point below the bed level and configured to input the char produced by the first reactor (500) substance directly into the second fluidized bed, for reacting with the oxygen and superheated steam to produce the second syngas;

wherein:

the nozzle (440) of the second reactor (400) is in fluid communication with the first conduit (602), and char produced by the first reactor (500) is introduced through the nozzle (440), the second reactor (100) is configured to operate under conditions sufficient to convert the char into a second-stage product gas stream (910).

2. The system according to claim 1, further comprising:
a second conduit (612) connected to the first conduit (602), the second conduit (612) is configured to receive a portion of said syngas stream (600) as a first-stage product gas stream (610);

wherein:
the second reactor (100) and the second conduit (612) are connected such that the second-stage product gas stream (910) is merged with the first-stage product gas stream (610) to form the final product gas stream (950).

3. The system according to claim 2, further comprising:
a restriction orifice (660) configured to reduce a pressure of said first-stage product gas stream (610), prior to being merged with the second-stage product gas stream (910).

4. The system according to claim 3, further comprising:
a first cyclone (300) configured to receive the syngas stream (600) via the first conduit (602); wherein:
the second conduit (612) is connected to the first conduit (602) via the first cyclone (300); and the restriction orifice (660) is placed downstream of the first cyclone (300).

5. The system according to claim 1, further comprising:
a third cyclone (900) configured to receive a solids-laden second-stage product gas (710) from the cyclone (700) within the second reactor (100), the third cyclone (900) configured to produce a second-stage product gas stream (910) by separating ash and carbon from the solids-laden second-stage product gas (710).

6. The system according to claim 1, further comprising:
a riser (200) connected to the second reactor (100) and configured to convey bed solids in a direction away from the second reactor (100);
a first cyclone (300) connected to the first reactor (500) and to the riser (200) via the first conduit (602); and
a dipleg (400) having a first end connected to the first cyclone (300) and a second end connected to the nozzle (440) of the second reactor (100), the dipleg (400) configured to transfer char from the first reactor (500) to the second reactor (100).

7. The system according to claim 6, wherein:
the riser (200) conveys the bed solids (120) towards said first conduit (602);
the first cyclone (300) is configured to receive a mixture of said bed solids (120) and the syngas stream (600) conveyed through the first conduit (602), and separate said mixture into an intermediate solids mixture (650) and the first-stage product gas stream (610); and
the dipleg (400) conveys the intermediate solids mixture (650) from the first cyclone (300) to a dense fluid bed (110) of the second reactor (100);
wherein:
the intermediate solids mixture (650) includes bed solids (120) and char.

8. The system according to claim 7, further comprising:
a gas-solids flow regulator (2000) interposed between a dipleg first section (402) connected to the first cyclone (300) and a dipleg second section (404) connected to the nozzle (440) of the second reactor (100); wherein:
the gas-solids flow regulator (2000) is provided with a fluidization media inlet (2130) configured to receive a fluidization media.

9. The system according to claim 6, wherein:
the dipleg (400) and the riser (200) enter the second reactor (100) at locations that are circumferentially spaced apart from one another by at least 90 degrees.

10. The system according to claim 6, wherein:
the riser (200) includes a conveying fluid inlet (240) which extends into the second reactor (100) and terminates in a conveying fluid injector (242), the conveying fluid injector (242) configured to inject a conveying fluid into a riser entrance section (210, 210*a*) within the second reactor (100).

11. The system according to claim 10, wherein:
the conveying fluid injector (242) includes a bent tip that is configured to inject conveying fluid into a riser inlet (250) that is located at a lowermost portion of the riser (200).

12. The system according to claim 11, wherein:
the riser (200) comprises an upwardly inclined riser entrance section (210) connected to the second reactor (100) and a vertical riser pipe (220) which is angled relative to the riser entrance section (210).

13. The system of claim 1, further comprising:
a cooling pipe (180) that protrudes into the second fluidized bed of the second reactor (100) to control bed operating temperature, the cooling pipe (180) being connected to a source of elevated pressure steam as a coolant; wherein:

the second reactor (100) is configured to operate such that the cooling pipe (180) superheats the elevated pressure steam.

14. The system of claim 1, further comprising:

a heat recovery steam generator (HRSG) that is configured to generate steam from the first syngas and the second syngas.

15. The system of claim 14, further comprising:

a gas clean up system that is configured to accept the first syngas and the second syngas discharged from the heat recovery steam generator (HRSG).

16. The system of claim 1, wherein the second fluidized bed has a bulk density that ranges from 10 pounds per cubic foot to 60 pounds per cubic foot.

* * * * *